(12) United States Patent
Sakamoto et al.

(10) Patent No.: US 12,063,520 B2
(45) Date of Patent: Aug. 13, 2024

(54) STATION PLACEMENT DESIGNING ASSISTANCE APPARATUS, STATION PLACEMENT DESIGNING ASSISTANCE METHOD AND PROGRAM

(71) Applicant: NIPPON TELEGRAPH AND TELEPHONE CORPORATION, Tokyo (JP)

(72) Inventors: Kazumitsu Sakamoto, Musashino (JP); Kenji Suzuki, Musashino (JP); Yohei Katayama, Musashino (JP); Yosuke Fujino, Musashino (JP); Hiroyuki Fukumoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 319 days.

(21) Appl. No.: 17/596,396

(22) PCT Filed: Jun. 13, 2019

(86) PCT No.: PCT/JP2019/023413
§ 371 (c)(1),
(2) Date: Dec. 9, 2021

(87) PCT Pub. No.: WO2020/250366
PCT Pub. Date: Dec. 17, 2020

(65) Prior Publication Data
US 2022/0240100 A1    Jul. 28, 2022

(51) Int. Cl.
*H04W 16/18* (2009.01)
*H04W 64/00* (2009.01)

(52) U.S. Cl.
CPC ......... *H04W 16/18* (2013.01); *H04W 64/003* (2013.01)

(58) Field of Classification Search
CPC ..... H04W 16/32; H04W 84/12; H04W 16/20; H04W 48/10; H04W 72/23; H04W 72/21;
(Continued)

(56) References Cited

U.S. PATENT DOCUMENTS 6,148,194 A * 11/2000 Kao ..................... H04B 17/318
455/67.14
8,213,942 B2 * 7/2012 Likar ................. H04W 36/0085
455/67.11
(Continued)

FOREIGN PATENT DOCUMENTS

| EP | 003675547 A1 * | 8/2018 | ............ H04W 16/18 |
| JP | 2001285923 A | 10/2001 | |
| JP | 5538286 B2 | 7/2014 | |

*Primary Examiner* — Jung Liu
(74) *Attorney, Agent, or Firm* — Harness, Dickey & Pierce, P.L.C.

(57) ABSTRACT

A station installation designing assistance device that divides a service providing area into a plurality of areas, and performs station installation designing for the plurality of areas in parallel, the station installation designing assistance device including: an area dividing unit that divides an entirety of the service providing area into the plurality of areas; a station installation priority determining unit that determines, for each of the plurality of areas, station installation priorities of station installation location candidates that are present in the area; and a station installation priority adjusting unit that adjusts the station installation priorities determined by the station installation priority determining unit, based on a degree of overlap of cells formed as a result of base stations being installed in station installation location candidates in the areas, respectively.

4 Claims, 6 Drawing Sheets

(58) Field of Classification Search
CPC ..... H04W 88/06; H04W 76/14; H04W 48/12; H04W 92/18; H04W 88/04; H04L 5/0092; H04L 5/0053
See application file for complete search history.

(56) References Cited

U.S. PATENT DOCUMENTS

| | | | | |
|---|---|---|---|---|
| 8,862,147 | B2* | 10/2014 | Kim | H04W 36/00835 |
| | | | | 455/457 |
| 11,805,528 | B2* | 10/2023 | Hosseini | H04L 5/0007 |
| 11,818,727 | B2* | 11/2023 | Wu | H04W 48/10 |
| 2007/0060150 | A1* | 3/2007 | Hart | H04W 16/32 |
| | | | | 455/446 |
| 2023/0292139 | A1* | 9/2023 | Srivastava | H04W 72/27 |

* cited by examiner

Fig. 3

| STATION INSTALLATION PRIORITIES (BEFORE ADJUSTMENT) ||
|---|---|
| AREA 1 | AREA 2 |
| STATION INSTALLATION LOCATION CANDIDATE #1 | STATION INSTALLATION LOCATION CANDIDATE #1 |
| STATION INSTALLATION LOCATION CANDIDATE #2 | STATION INSTALLATION LOCATION CANDIDATE #2 |
| ⋮ | ⋮ |

Fig. 4

| STATION INSTALLATION PRIORITIES (AFTER ADJUSTMENT) ||
|---|---|
| AREA 1 | AREA 2 |
| STATION INSTALLATION LOCATION CANDIDATE #1 | STATION INSTALLATION LOCATION CANDIDATE #2 |
| STATION INSTALLATION LOCATION CANDIDATE #2 | STATION INSTALLATION LOCATION CANDIDATE #1 |
| ⋮ | ⋮ |

STATION PLACEMENT DESIGNING ASSISTANCE APPARATUS, STATION PLACEMENT DESIGNING ASSISTANCE METHOD AND PROGRAM

CROSS-REFERENCE TO RELATED APPLICATIONS

This application is a 371 U.S. National Phase of International Application No. PCT/JP2019/023413 filed on Jun. 13, 2019. The entire disclosure of the above application is incorporated herein by reference.

TECHNICAL FIELD

The present invention relates to a station installation assisting designing device, a station installation assisting designing method, and a program.

BACKGROUND ART

With the development of IoT (Internet of Things) technology, it has increasingly become common that things that are equipped with various sensors and communication functions (hereinafter referred to as "IoT devices" or "terminals") are connected to networks, and remote data collection and remote control or the like of IoT devices are performed. Also, in recent years, LPWA (Low Power Wide Area network) has been attracting attention as a wireless communication method for IoT devices. Examples of LPWA include wireless communication methods such as LoRaWAN and Sigfox, which employ an unlicensed band (a frequency band that does not require a radio station license), and LTE-M (Long Term Evolution for Machines) and NB (Narrow Band)-IoT, which employ a license band (a frequency band that requires a radio station license).

It is common that IoT devices are fixedly installed and used mainly in specific locations. On the other hand, radio wave propagation is highly location-dependent. Therefore, if an IoT device is installed in a dead zone where the received power of radio waves from a base station is low, communication may become unavailable for a long period of time. Therefore, it is important to design station installation so that sufficient received power can be ensured in the location where an IoT device is planned to be installed.

In addition, when the number of terminals accommodated in a base station is too large, or when radio wave interference is frequently caused by an interference source such as a nearby base station, it may be impossible to ensure sufficient communication quality even if an IoT device is newly installed. In such a case, a communication failure frequently occurs. Therefore, in addition to evaluating the received power in the planned installation location as described above, it is important to take into consideration the usage status of the radio resources of a base station and the occurrence status of radio wave interference in the vicinity of the base station, to determine, in advance, whether or not a new IoT device can be accommodated. In order to perform such a determination, a means for estimating the success rate of communication is required.

With a wireless communication system in which terminals are fixedly installed, it is possible to estimate the success rate of communication for each terminal, based on information regarding, for example, a desired wave reception power, an interference signal power, a traffic pattern, and thermal noise power in the base station and the terminal, calculated from information indicating the installation location of the base station and the installation location of the terminal. Note that the aforementioned traffic pattern includes, for example, the frequency of uplink communications from the terminal to the base station, a communication time of each uplink communication, a communication time of an ACK (Acknowledge) signal from the base station to the terminal, and so on.

Conventionally, techniques have been disclosed for designing station installation so as to satisfy both a constraint condition such as a condition that a capacity that meets the demand for communication traffic is secured, for example, and an optimization condition such as a condition that the entire service providing area is covered by a minimum number of base stations, for example (for example, see PTL 1 and PTL 2).

Conventional station installation designing techniques as disclosed in PTL 1, PTL 2, and so on are most effective when station installation designing is performed for the entire service providing area all at once. However, with such conventional techniques, it is necessary to perform calculation for station installation designing after importing a large amount of data such as 3D (three-dimensional) map data, data indicating candidate sites for station installation, and data regarding existing base stations, for the entire service providing area, which is typically a vast area. Therefore, a huge number of computational resources are required.

Note that 3D map data includes information regarding the altitude of each point, the height of the building, and a land use classification, for example. Data regarding the existing base stations also includes data regarding base stations that are planned to be installed in the station installation locations selected through station installation designing, for example.

As described above, a huge number of computing resources are required when station installation designing is performed for the entire service providing area all at once. Therefore, in general, the entire service providing area may be divided into a plurality of areas, and station installation designing may be performed individually for each of the plurality of divisional areas. In such a case, in order to improve processing efficiency, station installation designing may be performed in parallel for the plurality of divisional areas.

Note that, in general, in order to ensure the accuracy of station installation designing at the ends of the divisional areas, station installation designing is performed after importing various kinds of data regarding a region that has been expanded (in the north, south, east, and west, for example) so as to include the area that is the subject of station installation designing.

CITATION LIST

Patent Literature

[PTL 1] Japanese Patent Application Publication No. 2001-285923
[PTL 2] Japanese Patent No. 5538286

SUMMARY OF THE INVENTION

Technical Problem

As a result of the entire service providing area being divided into a plurality of areas in this way, the amount of data to be imported by a station installation designing device per one instance of station installation designing is reduced.

Thus, it is possible to reduce the number of computational resources required per one instance of station installation designing. However, on the other hand, since station installation designing is performed independently and in parallel for the divisional areas, cells respectively formed by base stations installed in different areas may overlap each other at the boundaries of the divided areas. Therefore, there is a problem in that areas are inefficiently covered by the base stations.

FIG. 6 is a diagram illustrating the above-described problem in a case where station installation designing is performed in parallel for a plurality of divisional areas. The following describes a case in which, as shown in FIG. 6, service providing area is divided into nine areas and station installation designing is performed therefor, for example. In FIG. 6, the rectangle that indicates the outer contour represents the entire range of the service providing area. The service providing area is divided into nine areas in a mesh pattern. As shown in FIG. 6, the nine areas are respectively given area numbers (area 1 to area 9) for identification.

Also, in FIG. 6, the circles drawn in dotted lines represent cells formed by the base stations, in which station installation priorities are respectively indicated. The circles drawn in solid lines represent station installation location candidates. The number shown in each balloon represents the station installation priority given to the station installation location candidate pointed to by the balloon.

Here, for example, it is envisaged that station installation designing has been performed to select station installation location candidates for the areas 4, 5, and 6, respectively. Note that station installation designing is to be performed so as to satisfy the optimization conditions such as the condition that the number of base stations is minimized. It is also envisaged that station installation priorities have been determined as shown in FIG. 6 as a result of station installation designing. Note that, in FIG. 6, the first priority is shown in the area 4, and priority levels up to the second priority are shown in the areas 5 and 6, regarding the station installation priorities.

As described above, the station installation priorities are determined for each divisional area so that an optimization condition can be satisfied in the area. Therefore, as shown in FIG. 6, when attention is only paid to the area 5, for example, as a result of base stations being installed in the station installation location candidate that is given the first station installation priority and the station installation location candidate that is given the second station installation priority, the overlapping area of the cells respectively formed by the two base stations is small. Thus, it can be seen that the regions in the areas are efficiently covered.

On the other hand, when attention is paid to both the area 4 and the area 5, if base stations are respectively installed in the station installation location candidates that are given the first station installation priority in the areas, the two base stations will be adjacent to each other as shown in FIG. 6. Therefore, the overlapping area of the cells formed by the two base stations is large, and areas are inefficiently covered by the base stations.

Similarly, when attention is paid to both the area 5 and the area 6, if base stations are respectively installed in the station installation location candidates that are given the first station installation priority in the areas, the two base stations will not be adjacent to each other as shown in FIG. 6, and the cells formed by the two base stations will not overlap each other. However, if base stations are respectively installed in the station installation location candidates that are given the second station installation priority in the areas, the two base stations will be adjacent to each other as shown in FIG. 6. Therefore, the overlapping area of the cells formed by the two base stations is large, and areas are inefficiently covered by the base stations.

As described above, with the conventional techniques, cells formed by the base stations installed in the two areas may overlap each other at the boundaries of the divisional areas. Thus, there is a problem in that areas are inefficiently covered by the base stations.

The present invention has been made in view of the above-described situation, and aims to provide a technique for selecting a station installation location for abase station, which makes it possible to efficiently cover areas.

Means for Solving the Problem

One aspect of the present invention is a station installation designing assistance device that divides a service providing area into a plurality of areas, and performs station installation designing for the plurality of areas in parallel, the station installation designing assistance device including: an area dividing unit that divides an entirety of the service providing area into the plurality of areas; a station installation priority determining unit that determines, for each of the plurality of areas, station installation priorities of station installation location candidates that are present in the area; and a station installation priority adjusting unit that adjusts the station installation priorities determined by the station installation priority determining unit, based on a degree of overlap of cells formed as a result of base stations being installed in station installation location candidates in the areas, respectively.

Effects of the Invention

According to the present invention, it is possible to select station installation locations for base stations so that the base stations can efficiently cover areas.

BRIEF DESCRIPTION OF DRAWINGS

FIG. 3 is a diagram showing station installation priorities before adjustment processing that is performed by a station installation priority adjusting unit 13 according to an embodiment of the present invention.

FIG. 4 is a diagram showing station installation priorities after adjustment processing is performed by a station installation priority adjusting unit 13 according to an embodiment of the present invention.

DESCRIPTION OF EMBODIMENTS

The following describes an embodiment of the present invention with reference to the drawings.

[Functional Configuration of Station Installation Designing Assistance Device]

Figure 1:
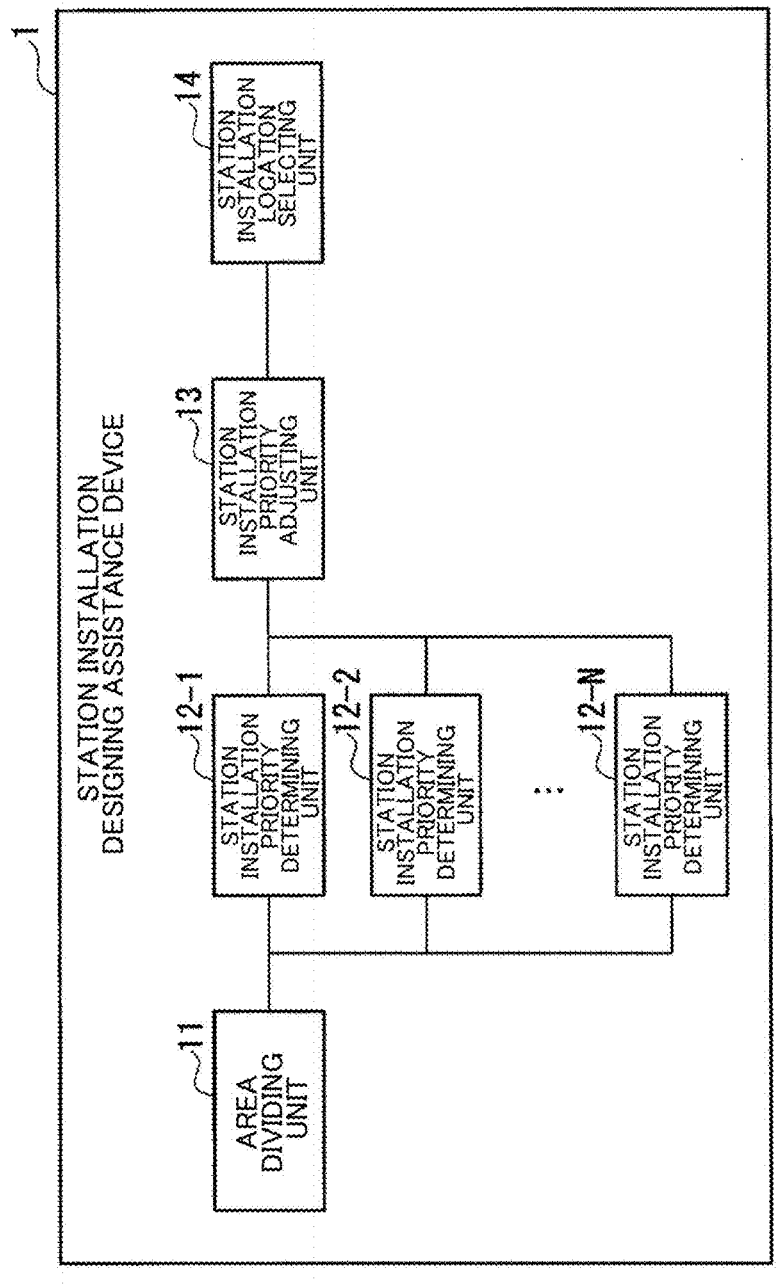
FIG. 1 is a block diagram showing a functional configuration of a station installation designing assistance device 1 according to an embodiment of the present invention.

FIG. 1 is a block diagram showing a functional configuration of the station installation designing assistance device 1 according to an embodiment of the present invention. As shown in FIG. 1, the station installation designing assistance device 1 includes an area dividing unit 11, station installation priority determining units 12-1 to 12-N, a station installation priority adjusting unit 13, and a station installation location selecting unit 14.

The area dividing unit 11 acquires various kinds of data regarding the entire service providing area that is the subject of station installation designing. Note that the area dividing unit 11 may be configured to acquire the data from an external device or the like, or configured to acquire the data that has been stored in advance in a recording medium (not shown) provided in the station installation designing assistance device 1 thereof.

The storage medium is formed using a RAM (Random Access Memory), a flash memory, an EEPROM (Electrically Erasable Programmable Read Only Memory), an HDD (Hard Disk Drive), or the like, or a combination of such storage media, for example.

The area dividing unit 11 divides the entire service providing area that is the subject of station installation designing, into N areas (areas 1 to N). Note that specification of the number of areas (the value of N) and allocation of area numbers that identify divisional areas are performed by a user or the like that performs station installation designing, for example. The area dividing unit 11 assigns N divisional areas (the areas 1 to N) to the station installation priority determining units 12-1 to 12-N, respectively.

The area dividing unit 11 outputs pieces of information indicating the area numbers corresponding to the areas respectively assigned to the station installation priority determining units 12-1 to 12-N, to the station installation priority determining units 12-1 to 12-N, respectively.

Note that the method for dividing an area is not specifically limited. For example, an area may be divided such that each area has the same area, or such that the number of station installation locations in each area is approximately the same.

The station installation priority determining units 12-1 to 12-N respectively acquire the pieces of information indicating the area numbers, output from the area dividing unit 11. The station installation priority determining units 12-1 to 12-N perform station installation designing for the areas corresponding to the acquired area numbers as subject areas, respectively.

The station installation priority determining units 12-1 to 12-N acquire various kinds of data regarding the areas corresponding to the acquired area numbers. Note that the station installation priority determining units 12-1 to 12-N may be configured to acquire the data from an external device or the like, or configured to acquire the data that has been stored in advance in a recording medium (not shown) provided in the station installation designing assistance device 1 thereof. Alternatively, the station installation priority determining units 12-1 to 12-N may be configured to acquire the data via the area dividing unit 11.

Based on the acquired various kinds of data, each of the station installation priority determining units 12-1 to 12-N determines station installation priorities for the station installation location candidates that are present in the area corresponding to the acquired area number. Each of the station installation priority determining units 12-1 to 12-N outputs information that indicates the determined station installation priorities to the station installation priority adjusting unit 13.

Note that, in a wireless communication system in which terminals are fixedly installed, it is important to perform station installation designing so that sufficient received power and communication success rate can be ensured in the locations where the terminals are installed. Therefore, for example, it is desirable that priorities are set to station installation location candidates so that a higher priority is set to a station installation location candidate that includes a larger number of terminals whose received power and communication success rate are equal to or greater than predetermined threshold values, respectively. In the present embodiment, priorities are to be set to station installation location candidates so that a higher priority is set to a station installation location candidate that includes a larger number of terminals whose received power and communication success rate are equal to or greater than predetermined threshold values.

Note that station installation designing for each area may be performed using a conventional station installation designing techniques disclosed in PTL 1, PTL 2, or the like.

Note that, in the present embodiment, when station installation priorities are to be determined for station installation location candidates in an area, station installation designing is performed after importing various kinds data regarding a region that has been expanded (in the north, south, east, and west, for example) so as to include the area that is the subject of station installation designing, in order to ensure the accuracy of station installation designing at the ends of the divisional area.

The station installation priority adjusting unit 13 acquires pieces of information indicating the station installation priorities of the station installation location candidates in the areas, respectively determined by the station installation priority determining units 12-1 to 12-N, respectively from the station installation priority determining units 12-1 to 12-N. The station installation priority adjusting unit 13 also acquires various kinds of data regarding the entire service providing area that is the subject of station installation designing.

Note that the station installation priority adjusting unit 13 may be configured to acquire the data from an external device or the like, or configured to acquire the data that has been stored in advance in a recording medium (not shown) provided in the station installation designing assistance device 1 thereof. Alternatively, the station installation priority adjusting unit 13 may be configured to acquire the data via the station installation priority determining units 12-1 to 12-N.

Based on the acquired information, the station installation priority adjusting unit 13 calculates the degree of overlap of cells formed by installing base stations in the station installation location candidates in each area. The station installation priority adjusting unit 13 adjusts the station installation priorities based on the degree of overlap of the cells thus calculated. Note that specific content of the station installation priority adjustment processing will be described later in detail. The station installation priority adjusting unit 13 outputs information indicating the adjusted station installation priorities of the station installation location candidates in each area to the station installation location selecting unit 14.

The station installation location selecting unit 14 acquires the information indicating the station installation priorities of the station installation location candidates in each area, output from the station installation priority adjusting unit 13. Based on the acquired information, the station installation location selecting unit 14 selects the station installation location candidates with the highest property in each area as the station installation location for a base station.

[Station Installation Priority Adjustment Processing]

The following describes station installation priority adjustment processing.

Figure 2:
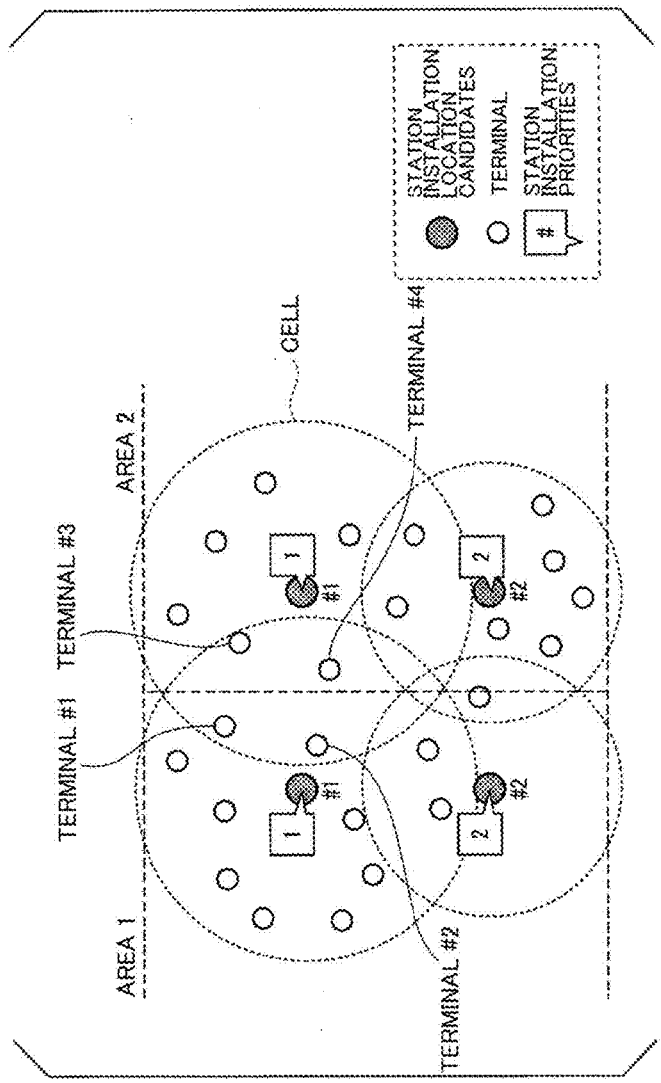
FIG. 2 is a diagram illustrating station installation priority adjustment processing that is performed by the station installation designing assistance device 1 according to an embodiment of the present invention.

FIG. 2 is a diagram illustrating station installation priority adjustment processing performed by the station installation designing assistance device 1 according to an embodiment of the present invention.

As shown in FIG. 2, the following describes station installation priority adjustment processing according to the present embodiment in the case of selecting station installation locations for base stations that accommodate terminals that are present in the vicinity of boundaries between the area 1 and the area 2.

In FIG. 2, the circles drawn in dotted lines represent cells formed by base stations whose station installation priorities are respectively indicated. The shaded circles drawn in solid lines represent station installation location candidates. The non-shaded circles drawn in solid lines represent terminals. The number shown in each balloon represents the station installation priority given to the station installation location candidate pointed to by the balloon.

In order to simplify the drawing to facilitate explanation, only two station installation location candidates (a station installation location candidate #1 and a station installation location candidate #2) are shown in FIG. 2 for each of the areas 1 and 2.

As shown in FIG. 2, the number of terminals that can be accommodated (hereinafter referred to as the "number of accommodated terminals") when a base station is installed in the station installation location candidate #1 in the areas 1 is thirteen. Terminals that can be accommodated are terminals whose received power and communication success rate are equal to or greater than predetermined threshold values, respectively. The number of accommodated terminals is three when a base station is installed in the station installation location candidate #2 in the area 1. The number of accommodated terminals is ten when a base station is installed in the station installation location candidate #1 in the area 2. The number of accommodated terminals is eight when a base station is installed in the station installation location candidate #2 in the area 2.

FIG. 3 is a diagram showing station installation priorities given to the station installation location candidates at the time before station installation priority adjustment processing has been performed by the station installation priority adjusting unit 13. As shown in FIG. 3, the priorities are given to the station installation location candidates in descending order of the number of accommodated terminals for each of the areas (for each of the areas 1 and 2).

As described above, for each of the areas 1 and 2, the number of accommodated terminals is the largest when abase station is installed in the station installation location candidate #1 (thirteen terminals in the area 1 and ten terminals in the area 2 as described above). However, as shown in FIG. 2, the terminals #1 to #4 are included in both of the two cells, namely the cell formed by the base station installed in the area 1 and the cell formed by the base station installed in the areas 2. Therefore, the overlapping range where the terminals #1 to #4 are present is an inefficient region.

Therefore, the station installation priority adjusting unit 13 first compares the number of accommodated terminals in the case where a base station is installed in the station installation location candidate #1 in the area 1 and the number of accommodated terminals in the case where a base station is installed in the station installation location candidate #1 in the area 2. Thereafter, the station installation priority adjusting unit 13 sets the area in which the number of accommodated terminals is larger than the other as an area that serves as a reference (hereinafter referred to as the "reference area"). In the example shown in FIG. 2, as described above, the number of accommodated terminals is thirteen when a base station is installed in the station installation location candidate #1 in the area 1, and the number of accommodated terminals is ten when a base station is installed in the station installation location candidate #1 in the area 2, and therefore the area 1 is to be set as the reference area.

The station installation priority adjusting unit 13 subtracts the number of terminals corresponding to the above-described overlapping portion (i.e., the terminals that are present in the range where the cells overlap each other) from the number of accommodated terminals in the case where a base station is installed in the station installation location candidate #1 in the area 2. As described above, the number of terminals in the overlapping portion is four, and therefore the number of accommodated terminals in the case where abase station is installed in the station installation location candidate #1 in the area 2 is six, which is obtained by subtracting four from ten.

On the other hand, the number of accommodated terminals is eight when abase station is installed in the station installation location candidate #1 in the area 2. Therefore, in the area 2, as a result of the above-described subtraction processing, the number of accommodated terminals when a base station is installed in the station installation location candidate #2 (eight) is greater than the number of accommodated terminals when a base station is installed in the station installation location candidate #1 (six).

In this case, the station installation priority adjusting unit 13 replaces the station installation priorities with one another according to the number of accommodated terminals updated in view of the overlapping portion. FIG. 4 is a diagram showing station installation priorities at the time after station installation priority adjustment processing has been performed by the station installation priority adjusting unit 13. Note that, in this example, the number of accommodated terminals in the case where a base station is installed in any of the other station installation location candidates (not shown) in the area 2 is less than six.

As described above, as a result of the station installation priority adjustment processing performed by the station installation priority adjusting unit 13, the first priority is given to the station installation location candidate #1 and the second priority is given to the station installation location candidate #2 without change, as the station installation priorities given in the area 1. On the other hand, the station installation priorities in the area 2 are adjusted so that the first priority is given to the station installation location candidate #2 and the second priority is given to the station installation location candidate #1.

Through the station installation priority adjustment processing performed by the station installation priority adjusting unit 13, it is possible to reduce inefficiency that occurs due to the overlapping area of the cells formed by base stations installed in different areas at the boundary of divisional areas. As a result, it is possible to perform efficient station installation designing even when the service providing area is divided into a plurality of areas and station installation designing is to be individually performed in parallel for the plurality of divisional areas.

Note that, in the above-described example, a range in which sufficient received power can be achieved when a base station is installed in a station installation location candidate is represented as a cell, and the communication success rate of every terminal in the cell is equal to or greater than a predetermined threshold value. However, in reality, the communication success rate may be lower depending on, for example, the degree of influence of interference with cells in the vicinity thereof, even if sufficient received power is ensured.

Note that, in the above-described example, the number of accommodated terminals is used as an indicator that indicates the degree of overlap of cells formed by base stations installed in areas that are adjacent to each other. However, an indicator that indicates the degree of overlap of cells is not limited in this way, and the area of the region where cells overlap each other may be used instead. In such a case, the station installation priority determining units 12-1 to 12-N determine the station installation priorities based on the area of the overlapping region of cells.

[Operations of Station Installation Designing Assistance Device]

The following describes examples of operations of the station installation designing assistance device 1.

Figure 5:
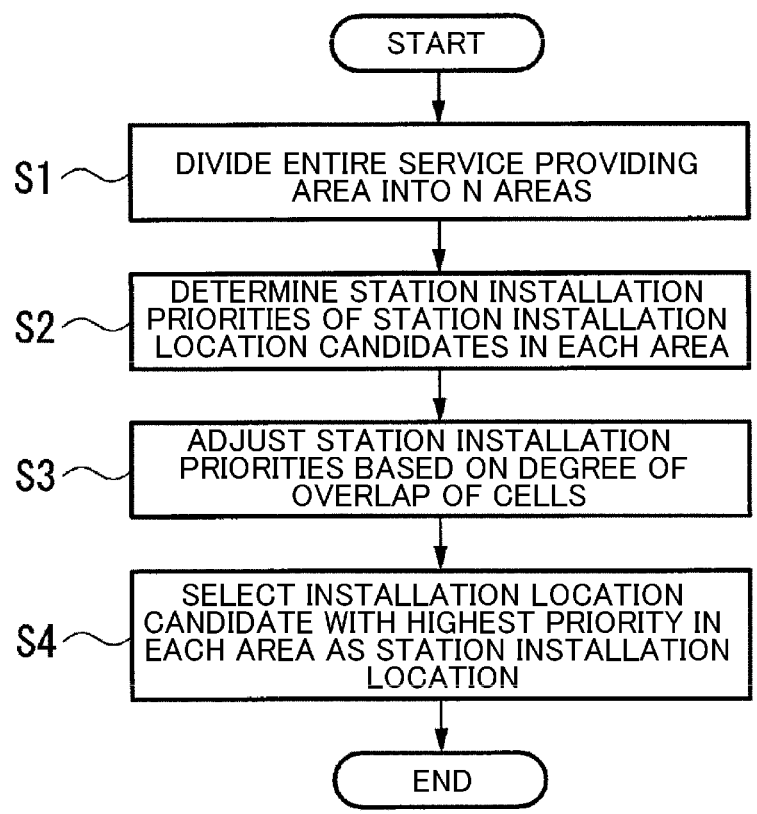
FIG. 5 is a flowchart showing operations of the station installation designing assistance device 1 according to an embodiment of the present invention.
Figure 6:
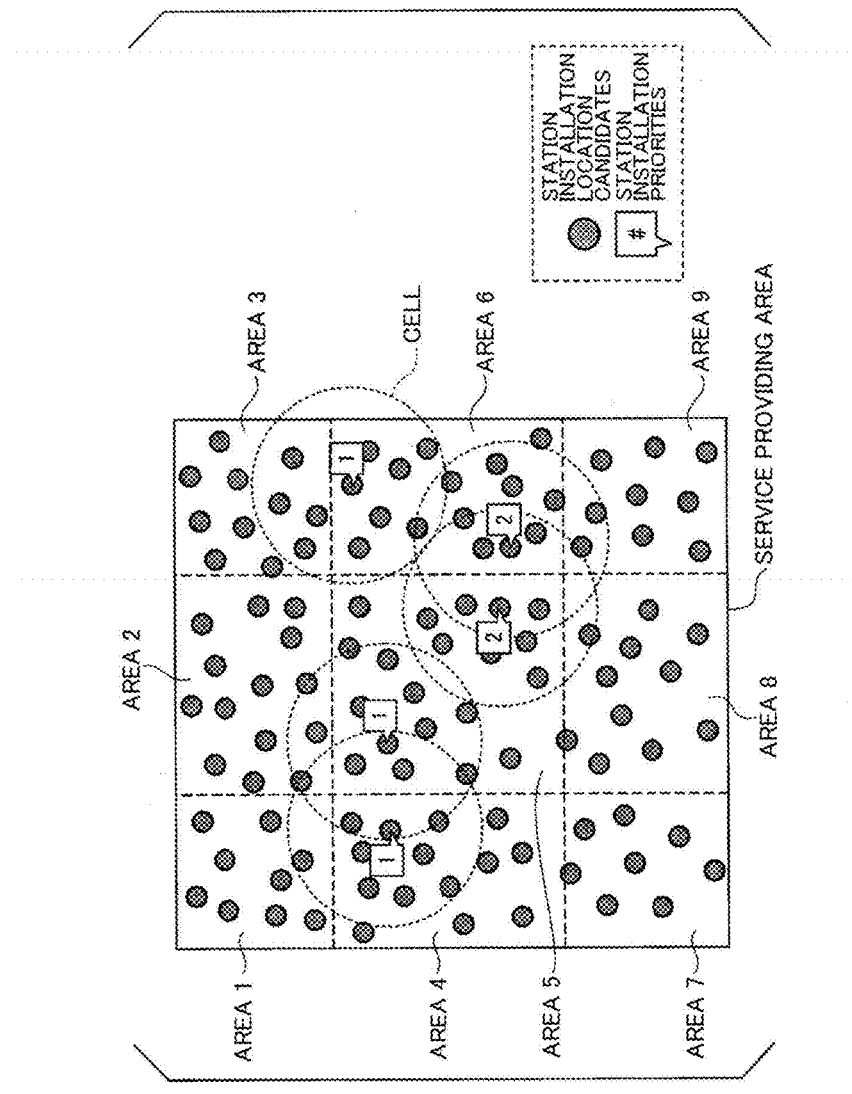
FIG. 6 is a diagram illustrating a problem in a case where station installation designing is performed in parallel for a plurality of divisional areas.

FIG. 5 is a flowchart showing operations of the station installation designing assistance device 1 according to an embodiment of the present invention.

The area dividing unit 11 divides the entire service providing area that is the subject of station installation designing, into N areas (areas 1 to N) (step S1). The area dividing unit 11 assigns N divisional areas to the station installation priority determining units 12-1 to 12-N, respectively.

Each of the station installation priority determining units 12-1 to 12-N determines the respective station installation priorities of the station installation location candidates in the area assigned thereto by the area dividing unit 11 (step S2).

The station installation priority adjusting unit 13 adjusts the station installation priorities of the station installation location candidates in the areas determined by the station installation priority determining units 12-1 to 12-N, based on the degree of overlap of the cells formed as a result of base stations being installed in the station installation location candidates in the areas (step S3).

The station installation location selecting unit 14 selects the station installation location candidate with the highest priority in each area as a station installation location for a base station, based on the station installation priorities of the station installation location candidates in the areas, adjusted by the station installation priority adjusting unit 13 (step S4). Thus, the operations of the station installation designing assistance device 1 shown in the flowchart in FIG. 5 is complete.

As described above, the station installation designing assistance device 1 according to an embodiment of the present invention divides a service providing area into a plurality of areas, and performs station installation designing for the plurality of areas in parallel. The station installation designing assistance device 1 includes: an area dividing unit 11 that divides an entirety of the service providing area into a plurality of areas; station installation priority determining units 12-1 to 12-N that each determine station installation priorities of station installation location candidates that are present in an area corresponding thereto of the plurality of areas; and a station installation priority adjusting unit 13 that adjusts the station installation priorities determined by the station installation priority determining units 12-1 to 12-N, based on the degree of overlap of cells formed as a result of base stations being installed in station installation location candidates in the areas, respectively.

With the above-described configuration, the station installation designing assistance device 1 according to an embodiment of the present invention divides the service providing area of a communication service provided by a wireless communication system and performs station installation designing for the plurality of divisional areas in parallel. In such a case, the station installation designing assistance device 1 can adjust the station installation priorities of the station installation location candidates respectively determined for the plurality of areas, based on the degree of overlap of cells formed as a result of base stations being installed in the station installation location candidates, respectively.

Such an adjustment is performed so that the number of terminals that can be accommodated increases, or the area of the overlapping region of the cells decreases. Thus, the station installation designing assistance device 1 selects the station installation location candidate with the highest adjusted station installation priority as the station installation location for a base station. Thus, the station installation designing assistance device 1 can select a station installation location for a base station so as to efficiently cover the area.

The station installation designing assistance device 1 in the above-described embodiment can be realized using a computer and a program. In such a case, the program may be recorded on a recording medium, or provided via a network.

The station installation designing assistance device 1 in the above-described embodiment may be realized using a computer. In such a case, the station installation designing assistance device 1 may be realized by recording a program for realizing the functions thereof on a computer-readable recording medium, and causing a computer system to read and execute the program recorded on the recording medium. Note that the "computer system" mentioned here may include hardware such as an OS and peripheral devices. The "computer-readable recording medium" may be a portable medium such as a flexible disk, a magneto-optical disk, a ROM, or a CD-ROM, or a storage device built in the computer system, such as a hard disk. Furthermore, the "computer-readable recording medium" may be a recording medium such as a communication line that dynamically holds a program for a short period of time when a program is transmitted via a network such as the Internet or a communication line such as a telephone line, or a recording medium that holds a program for a certain period of time, such as volatile memory in a computer system that serves as a server or client in such a case. Also, the above-described program may be a program for realizing some of the aforementioned functions, or a program that can realize the aforementioned functions in combination with a program that has already been recorded on the computer system, or a program that is realized using a programmable logic device such as an FPGA (Field Programmable Gate Array).

Although an embodiment of the present invention has been described above with reference to the drawings, it is clear that the above embodiment is merely an example of the present invention, and the present invention is not limited to the above embodiment. Therefore, it is possible to add, omit, replace, or apply another modification to the constituent elements without departing from the technical idea and the spirit of the present invention.

REFERENCE SIGNS LIST

1 Station installation designing assistance device
11 Area dividing unit
12-1-12-N Station installation priority determining unit
13 Station installation priority adjusting unit
14 Station installation location selecting unit

The invention claimed is:

1. A station installation designing assistance device that divides a service providing area into a plurality of areas, and performs station installation designing for the plurality of areas in parallel, the station installation designing assistance device comprising:
a processor; and
a non-transitory storage medium having computer program instructions stored thereon, when executed by the processor, perform to:
divides an entirety of the service providing area into the plurality of areas;
determine, for each of the plurality of areas, station installation priorities of station installation location candidates that are present in the area, where station priorities are assigned in descending order of number of terminals accommodated by a given station installation location candidate; and
adjusts the station installation priorities based on a degree of overlap of cells formed as a result of base stations being installed in station installation location candidates in the plurality of areas, respectively, wherein the station installation priorities are adjusted by
determine a number of accommodated terminals for the station installation location candidate having highest priority for each area in a given pair of areas from the plurality of areas,
set an area having the largest number of accommodated terminals in the given pair of areas as a reference area and set other area in the given pair of areas as a secondary area,
determine a number of terminals in an overlapping portion of the given pair of areas,
calculate a difference between the number of terminals in the overlapping portion and the number of accommodated terminals for the station installation location candidate having highest priority in the secondary area,
determine a number of accommodated terminals for the station installation location candidate having second highest priority in the secondary area, and
increase priority of the station installation location candidate having second highest priority in the secondary area in response to the difference being less the number of accommodated terminals for the station installation location candidate having second highest priority in the secondary area.

2. The station installation designing assistance device according to claim 1, wherein the computer program instructions further perform to selects, for each of the plurality of areas, a station installation location candidate with a highest priority in the station installation priorities as a station installation location for a base station.

3. A station installation designing assistance method for dividing a service providing area into a plurality of areas, and performing station installation designing for the plurality of areas in parallel, the station installation designing assistance method comprising:
dividing an entirety of the service providing area into the plurality of areas;
determining, for each of the plurality of areas, station installation priorities of station installation location candidates that are present in the area; and
adjusting the station installation priorities based on a degree of overlap of cells formed as a result of base stations being installed in station installation location candidates in the plurality of areas, respectively, wherein the station installation priorities are adjusted by
determining a number of accommodated terminals for the station installation location candidate having highest priority for each area in a given pair of areas from the plurality of areas,
setting an area having the largest number of accommodated terminals in the given pair of areas as a reference area and setting other area in the given pair of areas as a secondary area,
determining a number of terminals in an overlapping portion of the given pair of areas,
calculating a difference between the number of terminals in the overlapping portion and the number of accommodated terminals for the station installation location candidate having highest priority in the secondary area,
determining a number of accommodated terminals for the station installation location candidate having second highest priority in the secondary area, and
increasing priority of the station installation location candidate having second highest priority in the secondary area in response to the difference being less the number of accommodated terminals for the station installation location candidate having second highest priority in the secondary area.

4. A non-transitory computer-readable medium having computer-executable instructions that, upon execution of the instructions by a processor of a computer, cause the computer to function as the station installation designing assistance device according to claim 1.

* * * * *